United States Patent
Moon

[15] 3,682,308
[45] Aug. 8, 1972

[54] ENGINE COOLANT FILTER
[72] Inventor: Charles L. Moon, Brecksville, Ohio
[73] Assignee: White Motor Corporation
[22] Filed: Dec. 3, 1970
[21] Appl. No.: 94,782

[52] U.S. Cl. .................210/136, 210/167, 210/434
[51] Int. Cl. ..............................................B01d 35/02
[58] Field of Search................210/167, 74, 434, 136

[56] References Cited

UNITED STATES PATENTS 1,987,847   1/1935   Flood....................210/434 X

Primary Examiner—J. L. DeCesare
Attorney—Watts, Hoffmann, Fisher & Heinke

[57] ABSTRACT

A filter for engine coolant in an engine cooling system comprises a filter base connected to a coolant conduit and a filter body which is detachable from the base for replacement. Check valves are carried in the base filter inlet and outlet passageways so that the filter is replaced without coolant losses. A pressure differential is created across the filter assembly so that part of the coolant flowing through the conduit is forced through the filter. In one embodiment, the filter includes a ram tube and an ejector tube for creating the pressure differential. In another embodiment, a flow restricting orifice is provided in the conduit between the filter inlet and outlet passageways.

12 Claims, 3 Drawing Figures

PATENTED AUG 8 1972
3,682,308
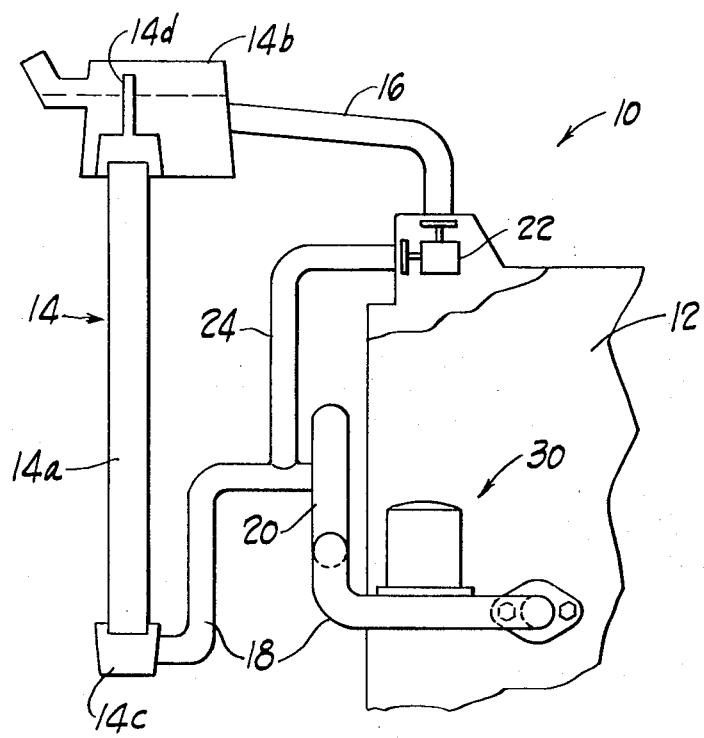
Fig. 1
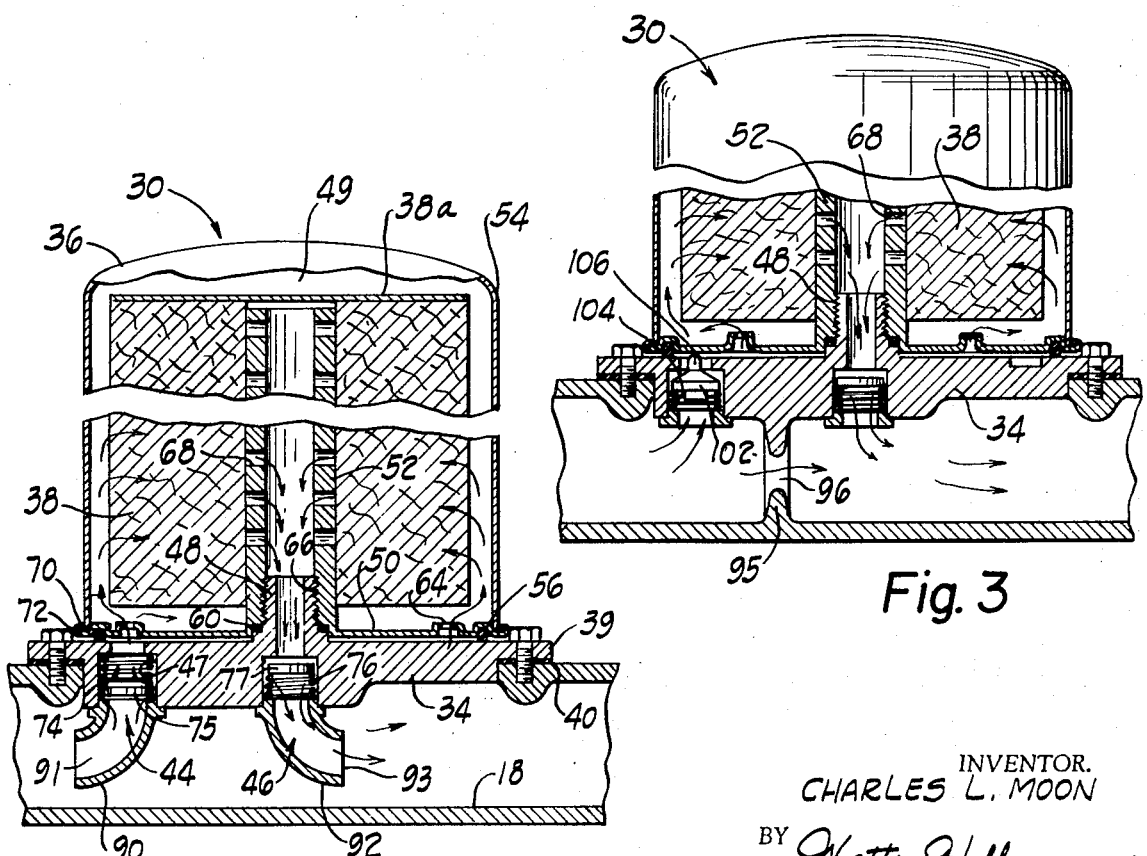
Fig. 2
Fig. 3
INVENTOR.
CHARLES L. MOON
BY Watts, Hoffmann,
Fisher & Heinke
ATTORNEYS

ENGINE COOLANT FILTER

BACKGROUND OF THE INVENTION

1. Field of the Invention

The present invention relates to engine cooling systems and more particularly to coolant filters used in engine cooling systems.

2. The Prior Art

Prior art proposals for engine coolant treatment systems have customarily comprised units which are separate from the conventional engine or radiator. These systems have required elaborate tanks, hoses, and valves which take up space in the engine compartment as well as requiring additional maintenance. Servicing these systems, for example, replacing a filter, was difficult because of relatively crowded and inconvenient locations of the components. Furthermore, it was necessary to close valves in inlet and outlet lines prior to servicing the filter so that coolant loss upon removal of the filter did not occur. If the valves were closed but not reopened, the filter was either "cut out" of the system or the system itself was blocked.

Some of the problems referred to were overcome by providing coolant treatment arrangements, such as filters, in a coolant surge tank of the system. These systems represented a marked improvement over the previously proposed systems, however, it was necessary to open the system to atmosphere and dismantle parts associated with the surge tank in order to service the filters or treatment media. Furthermore, it was frequently desirable to clean parts of the treatment system before reinserting them into the system.

SUMMARY OF THE INVENTION

The present invention provides a new and improved filter for an internal combustion engine coolant system. The new filter is quickly and easily removable from the system with minimal coolant losses. If the filter becomes clogged or blocked, the flow of coolant in the system continues unimpeded. The new filter does not require external hoses or valves to be incorporated in the coolant system.

In a preferred embodiment of the invention, the new filter includes a filter body defining a chamber in which a filter media or element is mounted. The filter body is mounted on a support base which is connected to a coolant conduit of the system. Inlet and outlet passageways in the filter base communicate the conduit with the filter chamber. Coolant from the conduit enters the filter chamber through the inlet passageway, passes through the filter element and is exhausted from the filter through the outlet passageway. The filter body is detachably connected to the base so that when the filter is replaced it is detached from the base and thrown away. A replacement filter body is quickly connected to the base and dismantling parts for cleaning is not required.

The coolant flow through the filter is in parallel with the flow through the conduit. The filter inlet and outlet passageways are provided with check valves which close when the coolant pump in the system is not operating. When the filter inlet and outlet passageways are closed, or the filter is blocked, coolant flows through the conduit without any substantial impedance.

A pressure differential is created across the filter assembly to assure a forced flow of substantial quantities of coolant through the filter. In one embodiment of the invention, the filter inlet passageway is defined in part by a ram tube which projects into the conduit. The ram tube opening faces upstream so that a portion of the coolant flowing in the conduit is forced into the ram tube and filter. The filter outlet passageway is formed in part by an ejector tube which projects into the conduit with its opening facing downstream.

This arrangement provides a ram pressure head at the filter inlet and a pressure level at the filter outlet which is less than the static coolant pressure at the filter outlet. Theoretically the pressure differential developed across the filter is twice the velocity head of the coolant flowing through the conduit. In practice, the differential pressure is less than the theoretical differential due to losses.

In another embodiment of the invention, a flow restricting element is situated in the conduit between the filter inlet and outlet passageways. The flow restricting element, which can be an orifice plate, provides a pressure differential across the filter which is equal to the pressure drop across the flow restrictor. The flow restricting orifice may also be any other metering passage or flow device that causes a suitable differential pressure, such as; thermostats, oil coolers, water pumps, etc.

The creation of a pressure drop across the filter insures that a substantial proportion of the coolant flow in the conduit passes through the filter. Hence, the system fluid is subject to continuous filteration every cycle of the coolant.

A principal object of the present invention is the provision of a new and improved filter for a fluid system which is quickly and easily replaced or serviced with minimal loss of fluid in the system, and wherein clogging of the filter does not substantially impede fluid flow in the system.

Another object of the invention is the provision of a new and improved filter of the character referred to wherein a pressure differential is created across the filter to force a substantial proportion of the system fluid through the filter.

Other objects and advantages of the invention will become apparent from the following detailed description of preferred embodiments made with reference to the accompanying drawings which form a part of the specification.

BRIEF DESCRIPTION OF THE DRAWINGS

FIG. 1 is a schematic diagram of an internal combustion engine coolant system embodying the present invention;

FIG. 2 is a vertical cross sectional view of a filter utilized in the coolant system shown in FIG. 1; and, FIG. 3 is a vertical cross sectional view of an alternate filter construction according to the invention.

DETAILED DESCRIPTION OF PREFERRED EMBODIMENTS

An internal combustion engine liquid coolant system 10 is illustrated in FIG. 1. The system 10 includes an engine block 12, a radiator 14, a coolant conduit 16 for conducting coolant from the engine block 12 to the radiator 14, a coolant conduit 18 for returning water from the radiator to the engine block, and a pump 20 in the conduit 18 which is driven from the engine to circulate coolant through the system 10.

A thermostatic flow directing valve 22 senses the temperature of the engine coolant and directs the flow of coolant from the block 12 through the conduit 16 when coolant temperatures are above a predetermined level. When the coolant temperature is below this level, the valve 22 terminates flow through the conduit 16 and opens a radiator bypass conduit 24 between the block 12 and the inlet of the pump 20. The coolant flows through the bypass 24 until its temperature is elevated sufficiently to actuate the valve 22 and open the conduit 16.

The radiator 14 includes a radiator core 14a which is vertically disposed between a top tank 14b and a bottom tank 14c. Coolant flowing from the engine block 14 passes into the top tank 14b through the conduit 16. Coolant descends through the core 14a to the bottom tank 14c from which it is delivered to the pump inlet via the conduit 18. A deaeration tube 14d projects above the coolant level in the top tank 14b so that gas in the core 14a is vented.

The system 10 thus far described may be of any suitable or conventional construction and therefore has not been illustrated or described in greater detail.

An engine coolant filter 30 is connected in the conduit 18 between the pump 20 and the engine block 12. One preferred construction of the coolant filter 30 is illustrated in FIG. 2 and includes a filter support base 34 connected to the conduit 18, a filter body 36 supported on the base 34 and a filter media, or element, 38 disposed in the body 36.

The support base 34 is sealingly engaged with the conduit 18. A peripheral flange 39 extends about the base, is attached to the conduit 18 by suitable screws which extend through the flange 39 and into threaded holes in the conduit wall. A gasket 40 is interposed between the flange 39 and the conduit wall to prevent coolant from leaking along the support base-conduit wall interface.

The filter 30 has an inlet passageway 44 and an outlet passageway 46 which provide a flow path for coolant through the filter parallel to flow through the conduit 18. The inlet passageway 44 is formed in part by an opening 47 extending through the base 34 from the conduit 18 to the filter body. The outlet passageway 46 extends through the base 34 and a threaded stud 48 which projects from the base into the filter body.

The filter body 36 defines a chamber 49 in which the filter element is supported. The inlet and outlet passageways communicate with the chamber 49 so that coolant flowing through the filter must pass though the filter element. The filter body 36 is formed by a sheet metal base plate 50 having a projecting center tube 52 and a cup-like cover member 54 connected to the base plate about its periphery.

The base plate 50 is sealingly mounted on the filter base 34. The base plate 50 confronts the filter base 34 and a sealing gasket 56 extends between the base 34 and the plate 50 along the plate periphery. The gasket 56 is preferably retained in an annular plate groove. An O-ring seal 60 is disposed between an inner peripheral shoulder of the plate 50 and the stud 48. Coolant flows into the chamber 49 through ports 64 in the plate 50 which are disposed between the peripheral gasket 56 and the O-ring seal 60.

The center tube 52 provides for connection of the filter body to the base and supports the filter elements. The center tube 52 is preferably integral with the base plate 50 and projects from the plate into the chamber 49. The center tube has internal screw threads 66 which thread onto the stud 48 so that the plate 50 can be firmly screwed down against the base 34. The center tube 52 defines a plurality of ports 68 along its length which communicate the chamber 49 to the outlet passageway in the interior of the center tube. The filter element 38 is an annular member which closely surrounds and is supported by the center tube. An imperforate disc 38a may be fixed to the upper end of the element 38 to prevent coolant from flowing into the tube 52 through the center opening in the element 38. Coolant passing through the ports 68 into the center tube 52 necessarily passes through the filter element first. It should be understood that the filter element may provide chemical treatment for the coolant. For example, where the coolant comprises water the filter element may contain water softening chemicals.

The cover 54 is sealingly fixed to the plate 50. The cover 54 overlies the filter element 38 and center tube 52 and includes a peripheral edge 70 having the same shape as the periphery of the base plate 50. In the illustrated embodiment, the base plate 50 has a rolled-over peripheral edge 72 which is crimped against the peripheral edge 70 of the cover. The cover edge 70 is flared slightly outwardly so that the edges are sealed together.

The filter body 36 is removed for replacement by unscrewing the center tube 52 from the stud 48, discarding the original filter body and screwing a replacement filter body onto the stud. This is accomplished with minimal coolant loss. To prevent coolant loss on removal of the filter body, check valves 74, 76 are positioned in the passageways 44, 46 respectively. The check valve 74 in the inlet passageway 44 includes a valve member 75 movable in the passageway and a biasing spring which urges the valve member toward a closed position in which the valve member blocks the passageway. The biasing spring urges the valve member against the flow of fluid from the conduit 18 into the filter body. The check valve 76 includes a valve member 77 which is movable in the outlet passageway 46 and a biasing spring which urges the valve member to a closed position against the flow of fluid to the conduit 18 from the filter through the passageway 46. The check valves are shown schematically and can be of any suitable construction. Furthermore, check valves can be employed which close the inlet and outlet passages only on removal of the filter body from the filter base 34.

A pressure differential is created across the filter whereby part of the coolant is forced through the filter assembly. Hence all of the coolant in the system is filtered once during a given relatively small number of cycles of the coolant. As shown in FIG. 2, a ram tube 90 forms part of the filter inlet passageway 44. The tube 90 extends from the filter base 34 into the conduit 18. An inlet opening 91 at the end of the ram tube 90 opens facing upstream in the conduit 18 so that coolant is forced, or rammed, into the tube 90 and thence into the filter body via the inlet passageway 44. The end of the tube 90 which is connected to the filter base forms the seat for the valve member 75. The ram tube opening is spaced away from the conduit wall and the filter base so that the ram effect is not diminished by eddy currents or the like.

The outlet passageway 46 is formed in part by an ejector tube 92 which extends from the filter base 34 into the conduit 18. An outlet opening 93 of the ejector tube faces downstream in the coolant flow and accordingly the flow of fluid past the ejector tube 92 creates a reduced pressure adjacent the outlet opening 93. This encourages the flow of fluid from the filter assembly through the outlet passageway 46 and the ejector tube 92. The end of the tube 92 connected to the filter base forms a spring seat for the biasing spring of the valve 76.

The pressure differential established across the filter approaches about twice the velocity head of coolant flowing through the conduit 18. This pressure differential creates a forced flow of coolant through the filter. A substantial proportion of the fluid flowing through the conduit 18 is thus forced through the filter and as the coolant circulates, it is constantly filtered.

If the filter element 38 becomes blocked or clogged, the flow of coolant through the conduit 18 remains substantially unaffected and cooling of the engine is likewise unaffected.

FIG. 3 illustrates a modification of a filter 30 in which the filter base 34 carries a flow restrictor member 95 which extends into the conduit 18. The flow restrictor member 95 defines an orifice 96 which is located in the conduit 18 between the filter inlet passageway 44 and the filter outlet passageway 46. The pressure drop created across the orifice 96 establishes a pressure differential across the filter body to provide a forced flow of coolant through the filter.

An alternate filter inlet check valve 100 is shown in FIG. 3. The valve 100 includes a valve member 102 and a biasing spring 104. The valve member 102 to biased to the closed position by the spring 104. The valve has a projecting pin 106 which is engaged by the filter body so that when the filter body is connected to the base the valve is opened. Pressure operated valves such as that shown in FIG. 2 can be used in the arrangement shown in FIG. 3 if desired.

A filter embodying the present invention can be constructed so that the filter inlet and outlet passageways are separated by various types of flow restricting elements. For example, the filter inlet and outlet passageways can be connected across a fuel preheating heat exchanger so that engine coolant passing through the system can be channeled in part through the fuel heating heat exchanger which serves as a device for creating a pressure differential across the filter inlet and outlet passageways.

Although two embodiments of the invention have been illustrated and described in considerable detail, the present invention is not to be considered limited to the precise constructions shown. It is the intention to cover hereby all adaptations, modifications and uses of the invention which come within the scope of the appended claims.

What is claimed is:

1. A filter connected to a coolant conduit in an internal combustion engine cooling system comprising:
   a. a filter base fixed to said conduit;
   b. a filter body detachably supported on said filter base;
   c. a first passageway communicating said conduit with said filter body through said filter base;
   d. a second passageway communicating said filter body with said conduit through said filter base;
   e. means associated with said filter base for creating a pressure differential across said filter body through said passageways to force coolant flowing in said conduit through said filter body; and,
   f. valve means in said filter base for blocking said passageways when said filter body is removed from said filter base.

2. A filter as claimed in claim 1 wherein said means for creating a pressure differential comprises a ram tube defining part of said first passageway, said ram tube projecting from said base into said conduit and opening towards the direction of flow of coolant in said conduit.

3. A filter as claimed in claim 2 wherein said ram tube opening is spaced substantially away from the conduit wall and said filter base.

4. A filter as claimed in claim 2 wherein said means for creating a pressure differential further comprises an ejector tube forming part of said second passageway and projecting into said conduit from said filter base, said ejector tube defining an opening facing downstream in said conduit.

5. A filter as claimed in claim 4 wherein said valve means comprises first and second valves in said first and second passageways respectively, said valves blocking flow through said passageways in the absence of a pressure differential across said passageways.

6. A filter as claimed in claim 4 wherein said valve means comprises at least one valve member in one of said passageways for blocking flow through said passageway in the absence of cooling flow in said conduit.

7. A filter as claimed in claim 1 wherein said valve means comprises at least one valve for blocking a passageway when said filter body is removed from said base.

8. A filter as claimed in claim 1 wherein said means for creating a pressure differential comprises an orifice defining member extending into said conduit from said filter base.

9. A filter as claimed in claim 1 wherein said filter body is threaded to said filter base and further including seal means between said filter body and said filter base for preventing leakage of coolant passing between said filter body and said filter base.

10. A filter as claimed in claim 9 wherein said filter body is a discardable unit.

11. An internal combustion engine cooling system including liquid coolant circulating conduits and a coolant treatment system comprising:
   a. a filter base integral with a conduit of said cooling system;
   b. a filter body detachably connected to said base and extending therefrom exteriorly of said conduit;
   c. a filter inlet passage extending through said base between said conduit and said filter body;

d. a filter outlet passage extending through said base from said filter body to said conduit;
e. valve means for closing said passageways to prevent coolant loss from said system when said filter is removed from said base; and,
f. means in said conduit between said filter inlet passage and said filter outlet passage for producing a coolant pressure differential whereby coolant tends to flow through said filter body.

12. A system as claimed in claim 11 wherein said valve means comprises at least one normally closed valve in one of said passages, said valve having a part engaged by said filter body and maintained open when said filter body is attached to said filter base, said valve closing said passage when said filter body is removed from said base.

* * * * *